(12) United States Patent
Wickersham et al.

(10) Patent No.: US 11,581,601 B1
(45) Date of Patent: Feb. 14, 2023

(54) FIRE SUPPRESSION SYSTEM FOR LITHIUM-ION BATTERY CONTAINERS

(71) Applicant: Fike Corporation, Blue Springs, MO (US)

(72) Inventors: Derek Michael Wickersham, Altamonte Springs, FL (US); Bradford T. Stilwell, Blue Springs, MO (US); Kevin Montgomery, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 0 days.

(21) Appl. No.: 17/580,922

(22) Filed: Jan. 21, 2022

Related U.S. Application Data

(60) Provisional application No. 63/247,493, filed on Sep. 23, 2021.

(51) Int. Cl.
*H01M 50/143* (2021.01)
*H01M 10/6567* (2014.01)
*H01M 50/673* (2021.01)
*H01M 10/0525* (2010.01)

(52) U.S. Cl.
CPC ..... *H01M 50/143* (2021.01); *H01M 10/0525* (2013.01); *H01M 10/6567* (2015.04); *H01M 50/673* (2021.01)

(58) Field of Classification Search
CPC .......... H01M 50/143; H01M 10/0525; H01M 10/6567; H01M 50/673
USPC ......................................................... 169/54
See application file for complete search history.

(56) References Cited

U.S. PATENT DOCUMENTS

| | | | |
|---|---|---|---|
| 2013/0115489 A1* | 5/2013 | Krause | H01M 10/6563 429/71 |
| 2020/0101335 A1* | 4/2020 | Liu | A62C 3/16 |
| 2021/0280929 A1* | 9/2021 | Perez | H01M 50/581 |

* cited by examiner

*Primary Examiner* — Gary D Harris
(74) *Attorney, Agent, or Firm* — Hovey Williams LLP

(57) ABSTRACT

A fire suppression system for use with lithium-ion battery storage containers is provided. The system utilizes water as a fire suppressant, which is stored in a tank and delivered to a battery module within the container that is experiencing a thermal event. After a predetermined time from the beginning of water flow, a controller within the system actuates one or more fans to ventilate the storage container to expel hazardous gases produced by the thermal event.

14 Claims, 5 Drawing Sheets

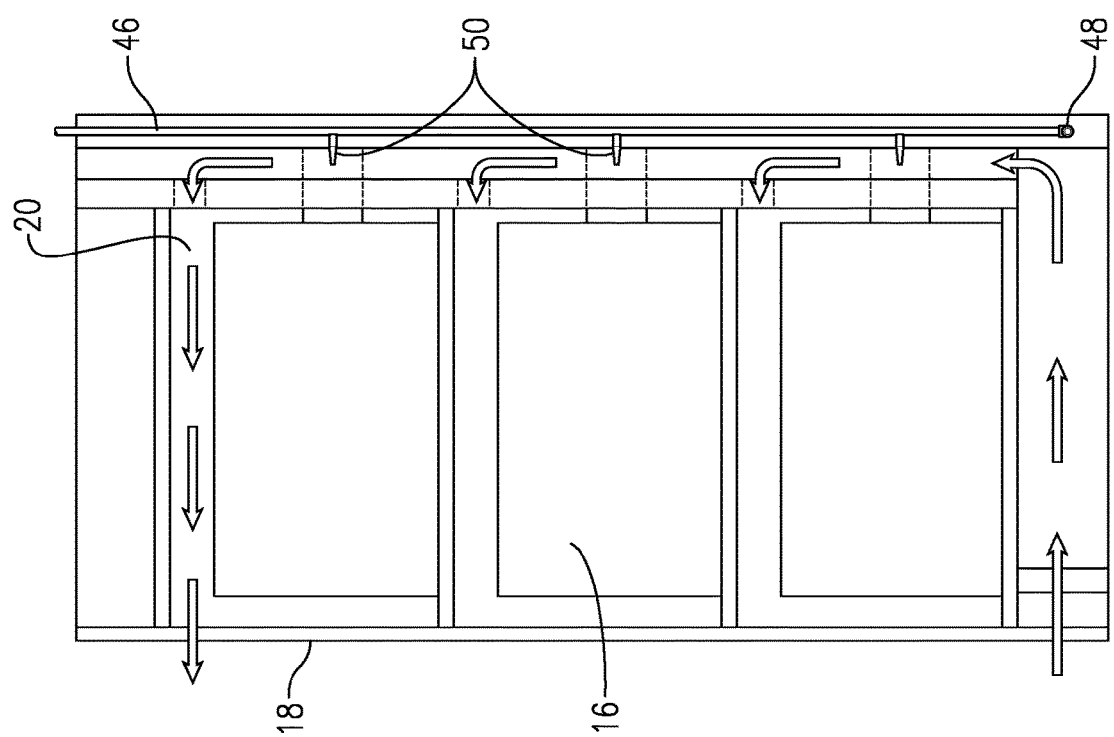

FIRE SUPPRESSION SYSTEM FOR LITHIUM-ION BATTERY CONTAINERS

CROSS-REFERENCE TO RELATED APPLICATION

This application claims the benefit of U.S. Provisional Patent Application No. 63/247,493, filed Sep. 23, 2021, which is incorporated by reference herein in its entirety.

BACKGROUND OF THE INVENTION

Field of the Invention

The present invention is generally directed toward a fire suppression system for use in mitigating fires caused by runaway thermal events in lithium-ion battery cells located within battery storage containers.

Description of the Prior Art

Alternative electrical power generation, such as solar and wind farms, is rapidly gaining ground against fossil-fuel power generation facilities in terms of overall market share. The downside to such alternative power generation is the problem of aligning power production with consumer demand. At times, alternative power generation facilities simply cannot produce enough power to meet consumer demand, such as at nighttime or cloudy weather, or in periods of calm winds. Moreover, even in the case of conventional power generation, consumer demand for power can outstrip the utility's generating capacity, such as during extreme weather events.

To address these problems, utilities have increasingly invested in energy storage technologies, such as battery farms, in order to fill in the gap between generating capacity and consumer demand. The battery farms generally comprise one or more enclosed structures in which modular battery assemblies are stored. The battery assemblies comprise a plurality of individual battery cells stacked together into modules, which are then placed on shelves within a rack. The battery modules are charged during periods in which the utility has excess generating capacity, and then discharged during the aforementioned periods in which demand outstrips generation capability.

While generally safe, lithium-ion batteries can experience untoward thermal events resulting from runaway chemical reactions within one or more battery cells. If detected quickly, the affected cells can be taken offline and the threat posed by the cell is mitigated. However, if the thermal event cannot be stopped, a fire or other hazardous condition, which could lead to an explosion, can develop. Thus, systems should be in place to prevent propagation of the thermal event to adjacent battery cells. There are both active and passive systems designed to prevent thermal event propagation. A passive system may involve venting of the affected battery module and/or use of fire-retardant materials in the construction of the battery module. Active systems generally involve the deployment of a fire suppressing agent into the area surrounding the battery cell suffering the thermal event.

While it is hoped that the on-site active anti-propagation system is effective in extinguishing the fire, such is not always possible. Therefore, it is an important feature of the active anti-propagation system to buy time for human intervention to either physically remove the affected battery module from the system or provide fire fighting support. However, in some instances, the battery farms are quite remote from first responders, and the time for the first responders to arrive on scene could be greater than the protection time afforded by the anti-propagation systems.

Thus, there is a need in the art for a fire suppression system that can be used with battery storage facilities that can provide fire suppression until first responders can arrive to take further action, but also a failsafe to prevent an explosion from occurring should the fire suppression means be exhausted before the first responders can arrive.

SUMMARY OF THE INVENTION

The present invention addresses the problems mentioned above and by providing a fire suppression system for use with one or more battery containers.

According to one embodiment of the present invention the fire suppression system comprises a water storage tank and a propellant tank connected to the water storage tank that is operable to deliver a pressurized gas to the water storage tank. A conduit network is connected with the water storage tank and extends into the one or more battery containers. The one or more battery containers comprise a plurality of battery racks each of which is configured to hold a plurality of battery modules. The conduit network comprises a plurality of nozzles, each being operable to deliver water from the water storage tank to one or more battery modules. A controller is coupled to the water storage tank that is operably connected to one or more exhaust fans located within the one or more battery containers. The controller is configured to actuate the one or more exhaust fans upon receiving a signal representing an operational condition associated with the water storage tank.

According to another embodiment of the present invention, there is provided a fire suppression system for use with one or more battery containers. The fire suppression system comprises an enclosure that is external to the one or more battery containers and having a water storage tank and a propellant tank connected to the water storage tank. The propellant tank is operable to deliver a pressurized gas from the propellant tank to the water storage tank. A conduit network is connected with the water storage tank and extends into the one or more battery containers. The conduit network is pre-charged with water under pressure provided by the pressurized gas from the propellant tank. The one or more battery containers comprise a plurality of battery racks, each of which is configured to hold a plurality of battery modules made up of a plurality of battery cells. The conduit network comprises a plurality of heat actuated nozzles each operable to deliver water from the water storage tank to a respective battery module. A controller is coupled to the water storage tank that is operably connected to one or more exhaust fans located within the one or more battery containers. The controller is configured to actuate the one or more exhaust fans and vent an interior compartment within the battery container in which the one or more battery racks are located upon receiving a signal representing an operational condition associated with the water storage tank.

According to still another embodiment of the present invention there is provided, a method of suppressing a fire within one or more battery containers. The method comprises providing a water storage tank and a propellant tank connected to the water storage tank. The propellant tank is configured to introduce a pressurized gas into the water storage tank. A conduit network is provided that is connected with the water storage tank and that extends into the one or more battery containers. The one or more battery containers comprise a plurality of battery racks, each of which is configured to hold a plurality of battery modules. The conduit network comprises a plurality of nozzles each operable to deliver water from the water storage tank to one or more battery modules. A flow of the water is delivered from the water storage tank through at least one of the plurality of nozzles in response to detection of a thermal event occurring within at least one of the battery modules. An operational condition associated with the water storage tank is detected and then one or more exhaust fans located within the one or more battery containers are activated in response to the detection of the operational condition associated with the water storage tank.

BRIEF DESCRIPTION OF THE DRAWINGS

FIG. 4 is a schematic side view illustration of a battery rack containing battery modules and the water delivery conduit with nozzles for delivering water to each module.

Figure 1:
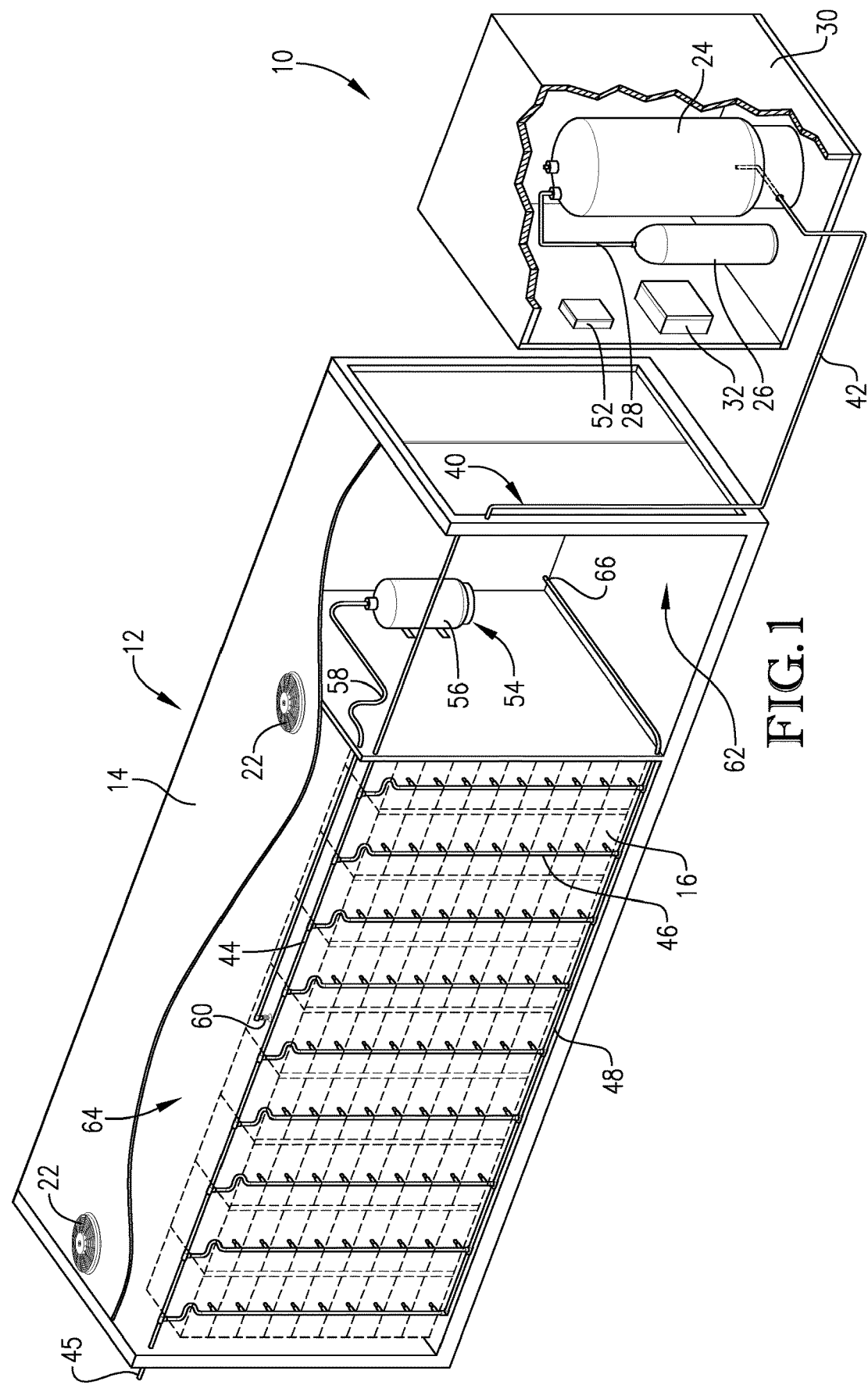
FIG. 1 is a perspective view of a fire suppression system installed within a lithium-ion battery container according to one embodiment of the present invention.
Figure 2:
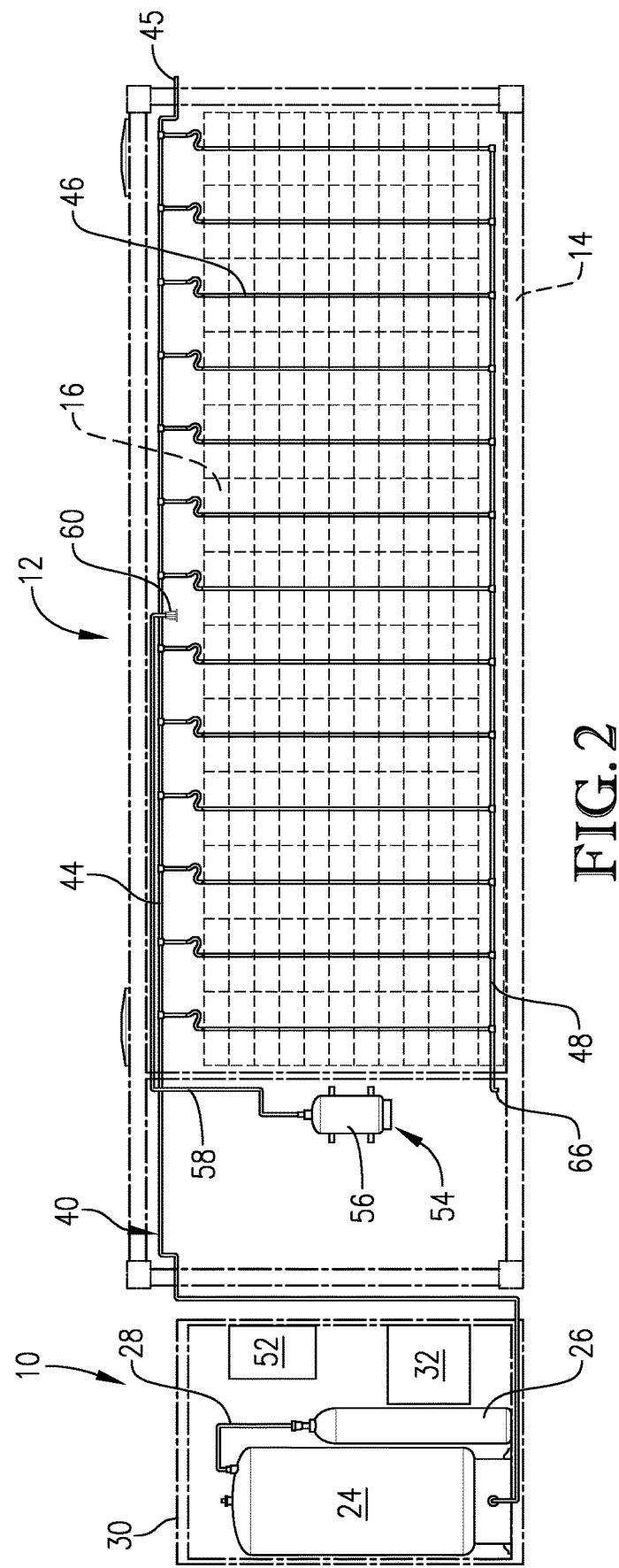
FIG. 2 is a side elevation view of the fire suppression system illustrating the water-delivery conduit network.

While the drawings do not necessarily provide exact dimensions or tolerances for the illustrated components or structures, the drawings are to scale with respect to the relationships between the components of the structures illustrated in the drawings.

DETAILED DESCRIPTION OF THE PREFERRED EMBODIMENT

Turning now to FIG. 1, a fire suppression system 10 for protecting a battery container 12 is shown. In one or more embodiments, the battery container 12 may comprise an enclosed structure 14 inside of which a plurality of battery modules 16 are located. Enclosed structure 14 may be any suitable enclosure, such as a stand-alone building, a room within a building, and a mobile container (e.g., a shipping container).

FIG. 6 depicts an exemplary battery rack assembly 18 comprising a plurality of battery modules 16 installed therein. The rack assembly 18 can be configured with ducts or channels 20 to facilitate cooling or venting of the battery modules 16 as indicated by the arrows. Each battery module 16 comprises a plurality of individual battery cells stacked together. The battery cells can be of any chemistry (preferably lithium ion) or configuration, such as cylindrical or prismatic.

Returning to FIG. 1, the battery container 12 includes one or more fans 22 installed therein. One function of fans 22 is to provide ventilation within battery container 12. In particular, fans 22 are configured to withdraw vapors or gases from within the enclosed structure 14 and direct them to a location outside of the enclosed structure. The placement of fans 22 as depicted in FIG. 1 is merely exemplary and other designs and configurations are possible without departing from the scope of the present invention. In addition, duct work, not shown, can be provided to direct the gases to a safe venting location.

Fire suppression system 10 comprises at least one water storage tank 24 and at least one propellant tank 26 that is connected to storage tank 24 via conduit 28. It is noted that conduit 28 is only illustrated schematically and that various controls and valves may be present as needed, especially if multiple tanks 24 and/or 28 are present. The water storage tank 24 is configured to store an amount of water, under pressure supplied by a pressurized gas from propellant tank 26, that is sufficient to provide a flow of water to one or more portions of the enclosed structure 14 for a predetermined period of time. This functionality is discussed in further detail below. The pressurized gas within propellant tank 26 is preferably an inert gas, such as nitrogen or carbon dioxide; however, any inert gas that is without a component that could serve as an oxidizing agent for a fire, especially a battery fire, can be used.

In one or more embodiments, water storage tank 24 and propellant tank 26 are located within an enclosure 30 that is separate from battery container 12. For example, enclosure 30 may be located outdoors or housed in a different building that is remote from battery container 12. A climate control unit 32 may be installed within enclosure 30 to provide heating or cooling as needed to maintain a desired operational temperature within the enclosure.

Fire suppression system 20 also comprises a controller 52 that is coupled to the water storage tank 24, and preferably to a switch assembly 34 (wired connections not shown) attached to the tank 24. The controller 52 is also connected with the one or more fans 22 located in battery container 12 and configured to actuate fans 22 upon receiving a signal representing an operational condition associated with the water storage tank, preferably from the switch assembly 34. Controller 52 may comprise an addressable or conventional control panel, such as a digital, peer-to-peer, bi-directional communication system available under the name CHEETAH Xi by Fike Corporation, Blue Springs, Mo.

In certain embodiments, controller 52 comprises additional functionality beyond detecting water storage tank operational conditions and fan control. For example, the controller 52 can use various technologies to detect smoke, flame, or off gases generated by batteries experiencing a thermal event. Smoke detection can be achieved through use of photo-electric smoke detectors, or air sampling smoke detectors, such as the VESDA detectors by Xtralis. Thermal or heat detection can be achieved through monitoring of the sprinkler heads, use of heat detectors, linear heat detection cables, fiber optic linear heat detection cables, and thermal video analytic imaging. Gas detection can be achieved through the use of stand-alone gas detectors such as hydrogen detectors (available from Honeywell Analytics), in rack gas detection (LI-ION TAMER by Xtralis), and smoke detectors with in-line SCL gas sensor for hydrogen or carbon monoxide detection (available from Xtralis). Controller 52 can also provide integration to building management systems or a programmable logic controller (PLC) via gateway to provide messaging from the fire panel. Controller 52 can also be configured to shut down charging circuits of batteries upon detection of a thermal event. Controller 52 can be configured to provide communication a central station or facility manager via a communicator and/or computer graphics workstation. Controller 52 can also activate local notification systems such as horns, bells, and strobes.

Figure 3A:
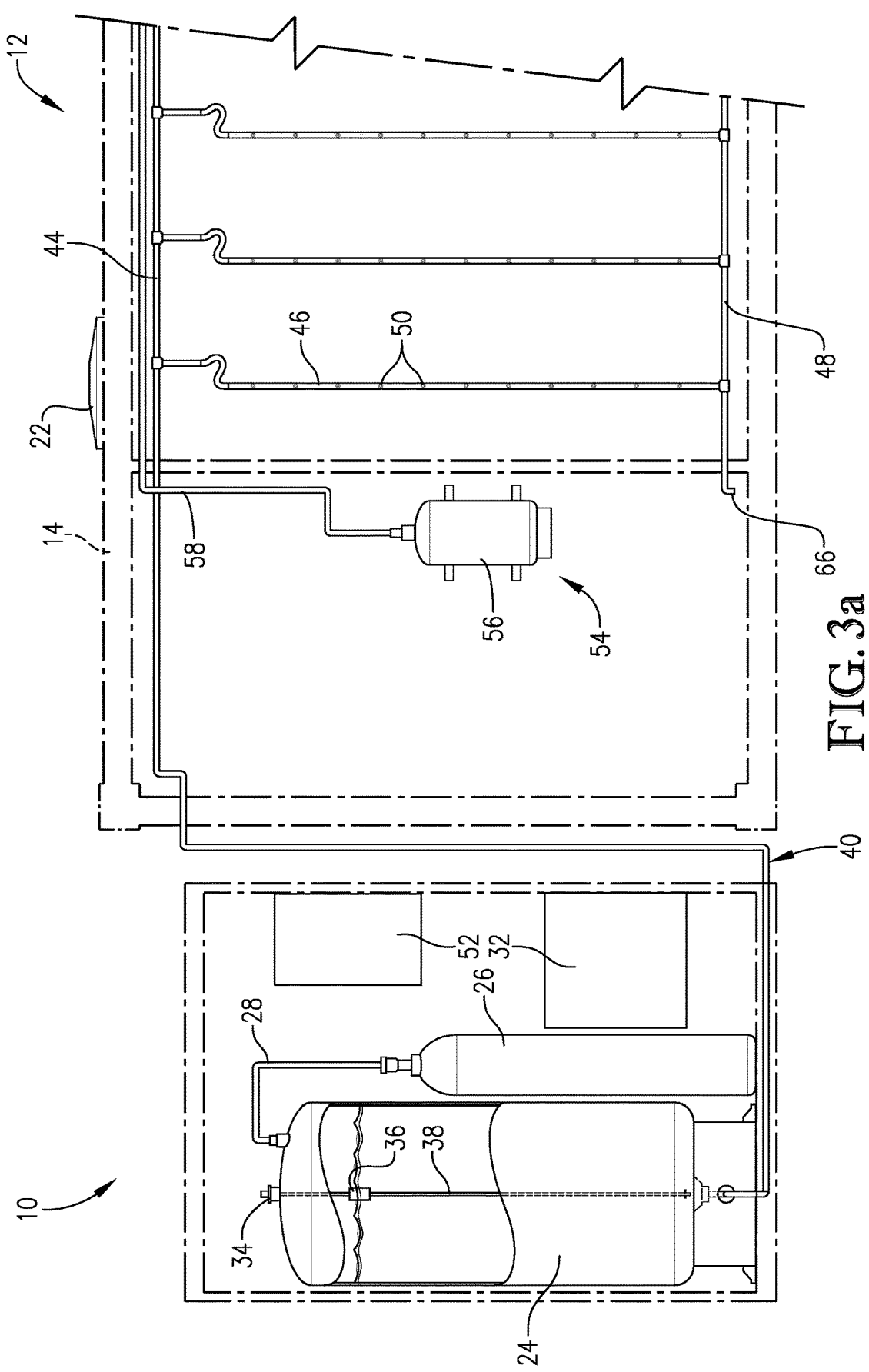
FIG. 3a is a close-up view of the fire suppression system enclosure containing the water storage tank and propellant tank, and of a portion of the protected battery container.
Figure 3B:
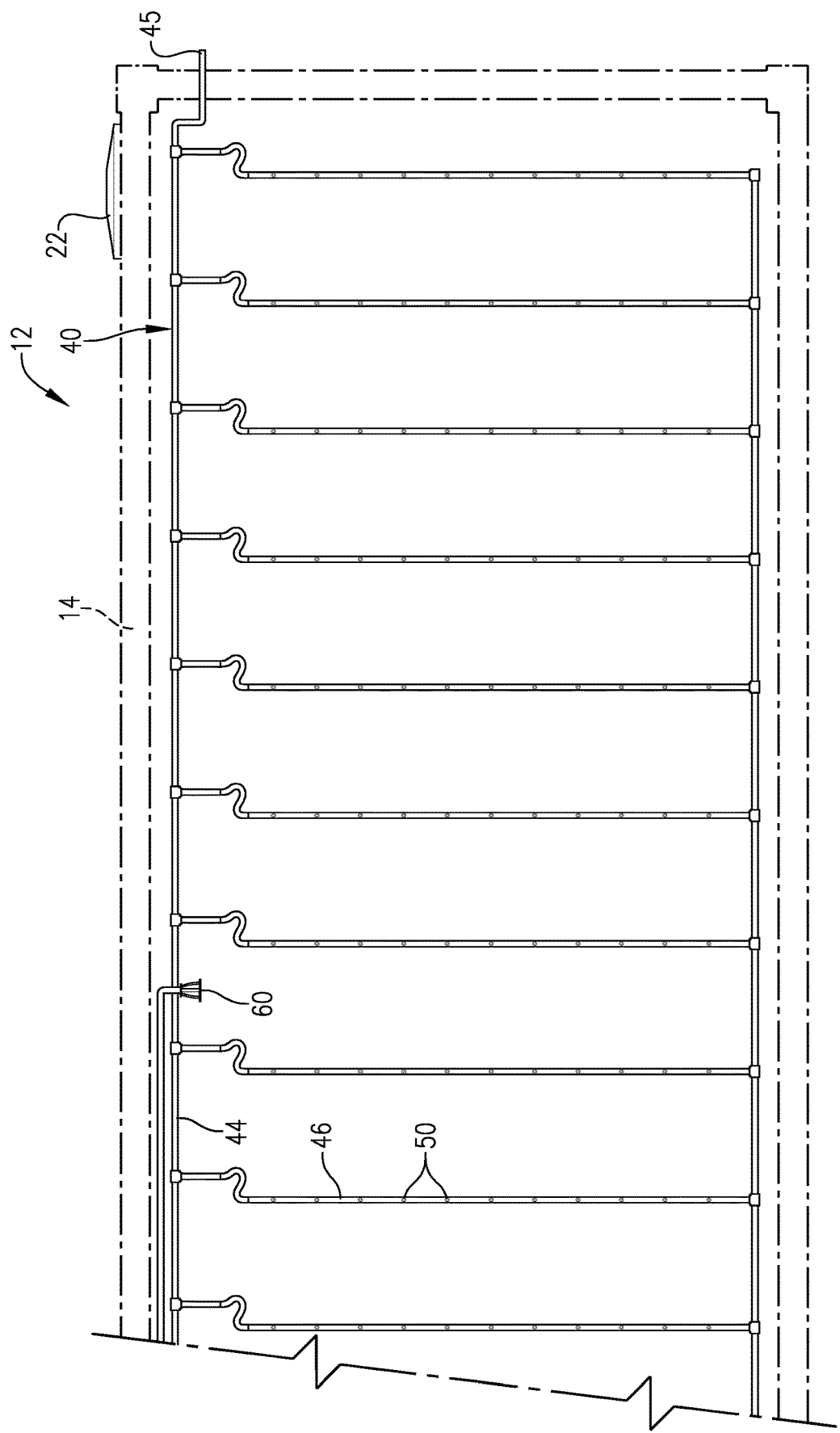
FIG. 3b is a close-up view of the protected battery container and water-delivery conduit network having nozzles installed corresponding with individual battery modules.

As can be seen in FIG. 3a, water storage tank 24 comprises a switch assembly 34 that is configured to detect a condition associated with the water level within the storage tank and communicate that condition to controller 52. Switch assembly 34 can be configured to detect an absolute water level within storage tank 24, flow of water out of storage tank 24, or otherwise a change in the amount of water present within storage tank 24. As illustrated, switch assembly 34 comprises a float switch located within storage tank 24. A float 36 is slidably received on rod 38 and a water level within the tank can be detected, and optionally compared with an earlier water level measurement to determine whether water is flowing out of the tank. Other types of switches and sensor arrangements can be employed without departing from the scope of the present invention, such as reed switches, magnetic switches, and flow meters. In addition, switch assembly 34 may comprise more than one switch and/or multiple types of switches.

The water storage tank 24 is connected to a conduit network 40 that extends into battery container 12. The conduit network 40 generally comprises one or more supply pipes 42 that connect the water storage tank 24 with a distribution header 44 located within the battery container 12. The distribution header 44 may be equipped with an outlet section 45 for coupling of the network with headers located in additional battery containers. A plurality of water delivery pipes 46 extend from header 44 and connect header 44 with a collector pipe 48. As depicted in the Figures, one water delivery pipe 46 is provided for each rack assembly 18, although it is within the scope of the present invention for conduit network 40 to be configured differently.

Each delivery pipe 46 comprises a plurality of water nozzles or heads 50 distributed along the length thereof. In one or more embodiments, at least one nozzle 50 is provided for each battery module located within rack assembly 18, although this need not always be the case depending upon how rack assembly 18 is configured. Nozzles 50 may comprise any kind of fire suppression system nozzle or head known to those in the art. However, in one or more embodiments, the nozzles 50 are passive and do not require input of any other sensor or device in order to activate. Exemplary nozzles 50 include those comprising a heat-sensitive element, such as a glass bulb or fusible link, that breaks or is sufficiently distorted upon exposure to elevated temperature conditions, typically between 70-95° C., which then permits water to flow through the nozzle. Thus, nozzles 50 may be configured to release a flow of water upon exposure to a nearby elevated temperature condition that is associated with a thermal event occurring within a battery module 16.

Optionally, fire suppression system 10 can further comprise an inert agent fire suppression system 54 that works alongside the water delivery system. Inert suppression system 54 comprises one or more inert suppressant tanks 56 connected to a distribution conduit 58, which comprises one or more nozzles 60 configured to disperse the suppressant into the protected area within battery container 12. Inert agent fire suppressants are known in the art and can include inert gas agents (e.g., nitrogen, argon, carbon dioxide, and mixtures thereof), NOVEC 1230, and FM-200. The inert agent fire suppression system 54 is configured to deprive an environment that is subject to or at risk of developing a fire of oxygen or so that combustion of materials within the environment cannot be sustained, or to interfere with the ability of oxygen present within the environment to combust with the fuel source. Suppression system 54 may be actuated through direct sensing of a fire hazard within the protected space using, for example temperature sensors, hydrogen detectors, or smoke detectors. Suppression system 54 may also be activated by the release of water from fire suppression system 10, and thus also be under the operational control of controller 52.

In one or more embodiments, the battery container 12 comprises a first compartment 62 in which the inert agent tank 56 is located, and a second compartment 64 in which the battery rack assemblies 18 and battery modules 16 are located. The at least one nozzle 60 is installed within the second compartment 64 and configured to introduce the inert suppressing agent into the second compartment alone. Although, it is certain possible for the inert suppressing agent to also be introduced into the first compartment 62 should such be deemed a necessary design requirement. In certain embodiments, the inert agent fire suppression system 54 is not intended to directly suppress a fire or thermal event arising within the battery module itself, although such can be a secondary effect of such a system. Rather, the inert agent system 54 has a primary function of preventing spread of a battery fire to ancillary components within the battery container 12, such as circuit boards, wire jackets, and insulation material.

As noted above, fire suppression system 10 can be configured to protect a plurality of battery containers 12. However, in one embodiment, the inert agent fire suppression system 54 is configured to protect a single battery container 12. Thus, each battery container 12 may be equipped with its own inert agent fire suppression system 54, even though it shares fire suppression system 10 with multiple containers.

During operation of fire suppression system 10, water storage tank 24 can be filled to the desired level for the given application. In addition, propellant tank 26 can be charged with pressurized gas sufficient for delivery of the water contained within tank 24. In one or more embodiments, the water storage tank and the propellant tank are configured to deliver a flow of water to the one or more battery modules affected by a thermal event for at least 10, 15, 20, 25, or 30 minutes from initiation of the water flow. In particular embodiments, the water storage tank 24 is configured to hold at least 100 gallons of water, or from about 100 to about 500 gallons of water, and propellant tank is charged with at least 1000 psi, or from about 1000 to about 3500 psi, of the pressurized gas.

In one or more embodiments, the conduit network 40 is pre-charged with water under pressure provided by the pressurized gas from the propellant tank 26 so that the flow of water can be immediately delivered to the battery module experiencing a thermal event. Thus, all gas contained within the conduit network can be bled from the system through conduit outlet 66, which may be equipped with a valve (not shown).

Once the system is charged, it stands ready for deployment when a thermal event is occurs, which triggers opening of one or more of the nozzles 50. The opening of one or more nozzles causes water to flow out of water storage tank 24 and into the conduit network 40. In one embodiment, controller 52 then may receive a signal from switch assembly 34 indicating the release of water from the storage tank 24. This signal may cause controller 52 to commence a timer programmed to countdown a predetermined length of time. In certain embodiments, the timer is set to count down a period of at least 5, 10, 15, 20, or 25 minutes, upon elapse of which controller 52 actuates one or more of fans 22 to ventilate enclosed structure 14.

In an alternate embodiment, once the flow of water from storage tank 24 into conduit network 40 begins, controller 52 may be alerted by take no immediate action. In such embodiment, the switch assembly 34 monitors the water level within storage tank 24 and sends signals to controller 52 indicating the water level. Controller 52 is preprogramed to delay actuation of fans 22 until a predetermined water level is reached. Once the predetermined water level is reached, controller 52 actuates one or more of fans 22 to ventilate enclosed structure 14.

In one or more embodiments, the flow of water is directed out of the one or more nozzles 50, into the rack assembly 18 and around one or more battery modules 16 that are experiencing the fire or thermal event. The flow of water is preferably sufficient to contain the thermal event within the affected battery module 16 and retard and/or prevent the propagation of the thermal even to adjacent battery modules. Once commenced, the flow of water continues until water storage tank 24 is empty, or the flow is cutoff via operator intervention, such as closing a valve within the conduit network 40.

If the battery container 12 is so equipped, the inert agent fire suppression system 54 can be activated simultaneous with fire suppression system 10, or whenever conditions warrant its activation. Because fans 22 are purposefully kept from being operated until a predetermined amount of water from storage tank 24 has been delivered, ventilation of the enclosed structure 14 is delayed, which keeps the inert fire suppressant within the enclosed structure for as long as practical and prevents the system from actively drawing in fresh air into the battery container 12, which could worsen the fire or thermal event.

It is intended that the flow of water to the affected battery module(s) 16 last for at least as long as it should take first responders to arrive on the scene to take further steps to control the fire hazard, including attaching an external water supply to conduit network 40 so that the flow of water can be continued even after the supply within tank 24 has been exhausted. However, the time for first responders to arrive can be dependent upon factors outside the control of the operators of the battery container 12. Therefore, it is possible that storage tank 24 may become depleted before responders arrive. As the level of water within the storage tank 24 draws down, the mission of fire suppression system 10 can change from that of fire suppression and anti-propagation to that of explosion risk mitigation. Lithium-ion battery fires and thermal events can result in the generation of explosive and toxic gases such as hydrogen, carbon dioxide, carbon monoxide, and hydrogen fluoride. A buildup of these gases within the battery container 12 can result in conditions that are quite hazardous to the first responders once they arrive on scene. Therefore, fire suppression system 10 actuates fans 22 to vent or exhaust the gases within container 12 to prevent or mitigate the dangers to first responders. Fans 22 can continue to ventilate container 12 until the first responder or container operator deems it safe to discontinue their usage.

System 10 can be further configured so that actuation of fans 22 is a failsafe operation. For example, if a thermal event is detected by a sensor, such as a hydrogen detector sensing the presence of hydrogen off gas from a battery cell, controller 52 can send a signal to (i) shut down charging circuits of the affected battery modules and/or adjacent modules, and (ii) activate fans 22 to keep the container atmosphere from reaching a lower explosive limit. However, should the ventilation fans 22 not be activated in response to the initial detection of the thermal event, controller 52 is configured to receive a signal representative of a second supervised or lower level of water within tank 24 and activate the ventilation fans 22.

We claim:

1. A fire suppression system for use with one or more battery containers comprising:
   a water storage tank and a propellant tank connected to the water storage tank and operable to deliver a pressurized gas to the water storage tank; and
   a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
   a controller coupled to the water storage tank that is operably connected to one or more exhaust fans located within the one or more battery containers, the controller being configured to actuate the one or more exhaust fans upon receiving a signal representing an operational condition associated with the water storage tank,
   wherein the controller is operable to detect commencement of a flow of water from the water storage tank to at least one of the plurality of nozzles and commencing a timer, wherein upon the elapsing of a predetermined period of time by the timer, the controller actuating the one or more exhaust fans.

2. The fire suppression system of claim 1, wherein the controller comprises a switch.

3. A fire suppression system for use with one or more battery containers comprising:
   a water storage tank and a propellant tank connected to the water storage tank and operable to deliver a pressurized gas to the water storage tank; and
   a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
   a controller coupled to the water storage tank that is operably connected to one or more exhaust fans located within the one or more battery containers, the controller being configured to actuate the one or more exhaust fans upon receiving a signal representing an operational condition associated with the water storage tank, wherein the controller comprises a switch, and
   wherein the switch comprises a float switch located within the water storage tank.

4. A fire suppression system for use with one or more battery containers comprising:
   a water storage tank and a propellant tank connected to the water storage tank and operable to deliver a pressurized gas to the water storage tank; and
   a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
   a controller coupled to the water storage tank that is operably connected to one or more exhaust fans located within the one or more battery containers, the controller being configured to actuate the one or more exhaust fans upon receiving a signal representing an operational condition associated with the water storage tank, the controller being operable to detect a water level within the water storage tank and configured to actuate the one or more exhaust fans once the water level reaches a predetermined level within the tank.

5. The fire suppression system of claim 1, wherein the propellant tank comprises a pressurized inert gas.

6. A fire suppression system for use with one or more battery containers comprising:
   a water storage tank and a propellant tank connected to the water storage tank and operable to deliver a pressurized gas to the water storage tank; and
   a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
   a controller coupled to the water storage tank that is operably connected to one or more exhaust fans located within the one or more battery containers, the controller being configured to actuate the one or more exhaust fans upon receiving a signal representing an operational condition associated with the water storage tank,
   wherein the propellant tank comprises a pressurized inert gas, wherein the pressurized inert gas comprises nitrogen.

7. The fire suppression system of claim 1, wherein each of the plurality of nozzles comprises a device operable to release a flow of water upon detection of an elevated temperature condition associated with a thermal event occurring within at least one of the battery modules.

8. A fire suppression system for use with one or more battery containers comprising:
   a water storage tank and a propellant tank connected to the water storage tank and operable to deliver a pressurized gas to the water storage tank; and
   a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
   a controller coupled to the water storage tank that is operably connected to one or more exhaust fans located within the one or more battery containers, the controller being configured to actuate the one or more exhaust fans upon receiving a signal representing an operational condition associated with the water storage tank,
   wherein each of the plurality of nozzles comprises a device operable to release a flow of water upon detection of an elevated temperature condition associated with a thermal event occurring within at least one of the battery modules,
   wherein the device comprises a heat-sensitive element that is normally in blocking relationship to the flow of water through the nozzle, upon experiencing an elevated temperature condition of a predetermined magnitude, the heat sensitive element permits water to flow through the nozzle.

9. The fire suppression system of claim 7, wherein the flow of water is sufficient to contain the thermal event within the affected battery module and retard and/or prevent the propagation of the thermal event to adjacent battery modules.

10. A fire suppression system for use with one or more battery containers comprising:
    a water storage tank and a propellant tank connected to the water storage tank and operable to deliver a pressurized gas to the water storage tank; and
    a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
    a controller coupled to the water storage tank that is operably connected to one or more exhaust fans located within the one or more battery containers, the controller being configured to actuate the one or more exhaust fans upon receiving a signal representing an operational condition associated with the water storage tank,
    wherein the system further comprises an inert fire suppression system installed within the one or more battery containers.

11. The fire suppression system of claim 10, wherein the one or more battery containers comprise a first compartment in which an inert suppressant storage tank is located, and a second compartment in which the plurality of battery racks is located, there being at least one inert agent nozzle installed within the second compartment configured to introduce the inert fire suppressant into the second compartment, the inert gas nozzle being operably connected with the inert gas storage tank via a piping network.

12. The fire suppression system of claim 1, wherein the water storage tank and the propellant tank are located in an enclosure that is separate from the one or more battery containers.

13. A fire suppression system for use with one or more battery containers comprising:
    a water storage tank and a propellant tank connected to the water storage tank and operable to deliver a pressurized gas to the water storage tank; and
    a conduit network connected with the water storage tank and extending into the one or more battery containers, the one or more battery containers comprising a plurality of battery racks each of which is configured to hold a plurality of battery modules, the conduit network comprising a plurality of nozzles each operable to deliver water from the water storage tank to one or more battery modules,
    a controller coupled to the water storage tank that is operably connected to one or more exhaust fans located within the one or more battery containers, the controller being configured to actuate the one or more exhaust fans upon receiving a signal representing an operational condition associated with the water storage tank,
    wherein the water storage tank and the propellant tank are configured to deliver a flow of water to the one or more battery modules for at least 10 minutes.

14. A fire suppression system for use with one or more battery containers comprising:
    an enclosure comprising a water storage tank and a propellant tank connected to the water storage tank, the propellant tank being operable to deliver a pressurized gas to the water storage tank, the enclosure being external to the one or more battery containers;
    a conduit network connected with the water storage tank and extending into the one or more battery containers, the conduit network being pre-charged with water under pressure provided by the pressurized gas from the propellant tank, the one or more battery containers comprising a plurality of battery racks each of which is configured to hold a plurality of battery modules made up of a plurality of battery cells, the conduit network comprising a plurality of heat actuated nozzles each operable to deliver water from the water storage tank to a respective battery module; and a controller coupled to the water storage tank that is operably connected to one or more exhaust fans located within the one or more battery containers, the controller being configured to actuate the one or more exhaust fans and vent an interior compartment within the battery container in which the one or more battery racks are located upon receiving a signal representing an operational condition associated with the water storage tank, wherein the controller is (a) operable to detect commencement of a flow of water from the water storage tank to at least one of the plurality of nozzles and commencing a timer, wherein upon the elapsing of a predetermined period of time by the timer, the controller actuating the one or more exhaust fans, and/or (b) operable to detect a water level within the water storage tank and configured to actuate the one or more exhaust fans once the water level reaches a predetermined level within the tank.

* * * * *